US008612355B2

(12) United States Patent
Lee et al.

(10) Patent No.: US 8,612,355 B2
(45) Date of Patent: Dec. 17, 2013

(54) DIGITAL RIGHTS MANAGEMENT PROVISION APPARATUS, SYSTEM, AND METHOD

(75) Inventors: Nam-Geol Lee, Seoul (KR); Hyung-Chan Kim, Yongin-si (KR); Gye-Baek Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 11/859,852

(22) Filed: Sep. 24, 2007

(65) Prior Publication Data

US 2008/0098481 A1    Apr. 24, 2008

Related U.S. Application Data

(60) Provisional application No. 60/852,992, filed on Oct. 20, 2006.

(30) Foreign Application Priority Data

Feb. 28, 2007  (KR) .................. 10-2007-0020390

(51) Int. Cl.
*G06Q 99/00*  (2006.01)

(52) U.S. Cl.
USPC .............................. 705/59; 705/51; 380/281

(58) Field of Classification Search
USPC ................. 705/50–51, 59; 380/281
See application file for complete search history.

(56) References Cited

U.S. PATENT DOCUMENTS

| | | |
|---|---|---|
| 6,944,776 B1 | 9/2005 | Lockhart et al. |
| 7,891,007 B2 * | 2/2011 | Waxman et al. ............... 726/27 |
| 2002/0018565 A1 * | 2/2002 | Luttrell et al. ............... 380/217 |
| 2002/0026445 A1 * | 2/2002 | Chica et al. ............... 707/100 |
| 2002/0138442 A1 * | 9/2002 | Hori et al. ............... 705/59 |
| 2003/0126086 A1 | 7/2003 | Safadi |
| 2005/0289139 A1 * | 12/2005 | Takashima et al. ............... 707/5 |
| 2006/0041748 A1 | 2/2006 | Lockhart et al. |
| 2006/0080529 A1 | 4/2006 | Yoon et al. |
| 2006/0095382 A1 * | 5/2006 | Mahlbacher ............... 705/59 |
| 2006/0107046 A1 * | 5/2006 | Raley et al. ............... 713/168 |

FOREIGN PATENT DOCUMENTS

| | | | |
|---|---|---|---|
| WO | 00/62189 A2 | 10/2000 | |
| WO | WO03/058485 A1 * | 7/2003 | ............. G06F 17/00 |
| WO | 2004/111804 A2 | 12/2004 | |

OTHER PUBLICATIONS

DRM Specification Candidate Version 2.0—Jul. 16, 2004 Open Mobile Alliance OMA-DRM-DRM-V2_0-20040716-C., 2004 Open Mobile Alliance Ltd. All Rights Reserved., 142 pages.*
Extended European Search Report issued Jul. 22, 2011 in counterpart European Application No. 07833454.7.

* cited by examiner

*Primary Examiner* — James D Nigh
(74) *Attorney, Agent, or Firm* — Sughrue Mion, PLLC

(57) ABSTRACT

Provided is digital rights management (DRM) provision technology, and more particularly, are an apparatus, system, and method which can easily provide content using one or more DRM systems. A DRM provision apparatus includes a content download unit which downloads encrypted real content and dummy content from a download server and which manages the downloaded real content and dummy content; a license management unit which manages a license issued by a license server; and a processing unit which manages the downloaded real content and dummy content and the issued license.

14 Claims, 10 Drawing Sheets

DIGITAL RIGHTS MANAGEMENT PROVISION APPARATUS, SYSTEM, AND METHOD

This application claims priority from Korean Patent Application No. 10-2007-0020390 filed on Feb. 28, 2007 in the Korean Intellectual Property Office and U.S. Provisional Patent Application No. 60/852,992 filed on Oct. 20, 2006 in the United States Patent and Trademark Office, the disclosures of which are incorporated herein by reference in its entirety.

BACKGROUND OF THE INVENTION

1. Field of the Invention

The present invention relates to digital rights management (DRM) provision technology, and more particularly, to an apparatus, system, and method which can easily provide content using one or more DRM systems.

2. Description of the Related Art

Generally, digital rights management (DRM) technology protects and manages the rights of digital content creators. According to the DRM technology, a content provision server stores content in an encrypted form and provides encrypted content and key information required to decrypt the encrypted content to a user when the user makes a request for purchasing the encrypted content. The DRM technology defines the number of times that digital content can be played back, whether or not the digital content can be duplicated, the number of times the content can be duplicated, and the like.

DRM functions are largely divided into the following: the protection of digital content, the management of usage rules of the digital content, and the management of a billing system. In order to protect digital content, the DRM technology encrypts the digital content and thus prevents the illegal distribution or use of the digital content in all stages (i.e., creation, distribution, use, and disposal) of its life cycle. In addition, the DRM technology enables only an authorized user with an encryption key to decrypt and use encrypted content. Therefore, even if the encrypted content is illegally distributed, it cannot be used without the encryption key.

However, DRM technologies (such as Microsoft (MS) DRM and Open Mobile Alliance (OMA) DRM) developed by various developers are not compatible with each other. That is, a DRM structure developed by a developer runs on hardware or software that supports the DRM structure of the developer, but not on other platforms. Therefore, a user has to purchase different hardware or software that supports each DRM.

In this regard, there is a need for a technology that can play back content to which different DRM standards developed by various developers have been applied, on any host device.

SUMMARY OF THE INVENTION

It is an aspect of the present invention to implement a content provision system using one or more digital rights management (DRM) systems.

However, the aspects of the present invention are not restricted to the one set forth herein. The above and other aspects of the present invention will become more apparent to one of ordinary skill in the art to which the present invention pertains by referencing a detailed description of the present invention given below.

According to an aspect of the present invention, there is provided a DRM provision apparatus including a content download unit downloading encrypted real content and dummy content from a download server and managing the downloaded real content and dummy content; a license management unit managing a license issued by a license server; and a processing unit managing the downloaded real content and dummy content and the issued license.

According to another aspect of the present invention, there is provided a DRM provision system including a packaging server performing a first packaging process and a second packaging on unencrypted real content and generating encrypted real content and dummy content; a download server downloading the encrypted real content and the dummy content; a license server generating and issuing a license for the encrypted real content; and a DRM provision apparatus receiving and managing the encrypted real content, the dummy content, ad the license.

According to another aspect of the present invention, there is provided a DRM provision method including receiving encrypted real content and dummy content; and receiving a license issued for the encrypted real content.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

Exemplary embodiments of the present invention will hereinafter be described in detail with reference to the accompanying drawings.

Figure 1:
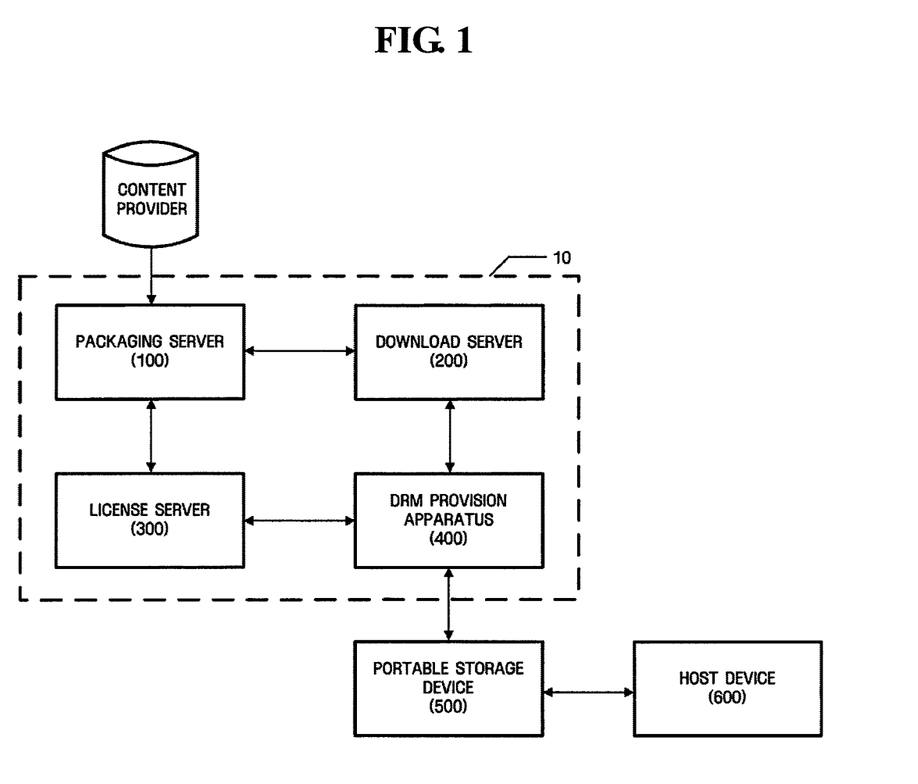
FIG. 1 illustrates a digital rights management (DRM) provision system according to an exemplary embodiment of the present invention.

FIG. 1 illustrates a digital rights management (DRM) provision system 10 according to an exemplary embodiment of the present invention. Referring to FIG. 1, the DRM provision system 10 includes a packaging server 100, a download server 200, a license server 300, and a DRM provision apparatus 400. The DRM provision system 10 may further include a portable storage device 500 using content registered by a content provider and storing content and its license by communicating with the DRM provision apparatus 400. The portable storage device 500 plays back content by being connected to a host device 600.

The content provider registers content, which is to be provided, with a contents management system (CMS). The CMS supports a function of managing the registration, retrieval, and deletion of a product (content) and a function of setting rights. In addition, the content provider registers meta information of content in order to distribute the content to users who desire to use the content, sets usage rights of the content for service business application, and decides the price of the content.

The packaging server 100 performs a first packaging process and a second packaging process on real content registered in the CMS by the content provider and generates dummy content and a DRM packaging file. Here, packaging denotes an encryption process for protecting content. The dummy content denotes a file required to receive a license for each DRM (such as Microsoft (MS) DRM and Open Mobile Alliance (OMA) DRM).

That is, the packaging server 100 packages content in order to support the MSDRM and the OMA DRM. The first and second packaging processes will be described in detail later with reference to FIG. 3.

The download server 200 provides (downloads) content requested by a user to the DRM provision apparatus 400. In this case, the downloaded content is the real content encrypted by the packaging server 100 and the dummy content. The operation of downloading content will be described in detail later with reference to FIG. 5.

The license server 300 issues (provides) a license for using the encrypted real content. Here, the license is issued based on information regarding the dummy content. The operation of receiving a license will be described in detail later with reference to FIG. 6.

The DRM provision apparatus 400 provides content (e.g., the encrypted real content and the dummy content) received from the download server 200 and the license server 300 to the portable storage device 500. The DRM provision apparatus 400 may be a kiosk, a personal computer (PC), a portable multimedia player (PMP), a settop box, or a mobile phone. The operation of the DRM provision apparatus 400 will be described in detail later with reference to FIG. 7.

The portable storage device 500 stores the encrypted content, the dummy content, and the license provided by the DRM provision apparatus 400. The portable storage device 500 includes a non-volatile memory, such as a flash memory, which can read, write and erase data, and is capable of performing a predetermined computation on data. In addition, the portable storage device 500 can easily be connected to or disconnected from the host device 600. Examples of the portable storage device 500 include a smart media, a memory stick, a CompactFlash (CF) card, an extreme Digital (xD) card, and a multimedia card (MMC). The operation of the portable storage device 500 will be described in more detail later with reference to FIG. 8.

Meanwhile, the encrypted content, the dummy content, and the license may already be stored in the portable storage device 500.

For example, a user may purchase the portable storage device 500 storing the encrypted content, the dummy content and the license, and use the encrypted content, the dummy content and the license already stored in the portable storage device 500. That is, the user can purchase a portable storage device storing predetermined content and always use the content on the host device 600.

The host device 600 can be connected to the portable storage device 500 and can play back a content object by using a license and a rights object. The host device 600 may be a portable content playback device, such as a mobile phone, a personal digital assistant (PDA) or an MP3 player, or a fixed content playback device such as a desktop computer or a digital television (TV). The operation of the host device 600 will be described in more detail later with reference to FIG. 9.

Figure 2:
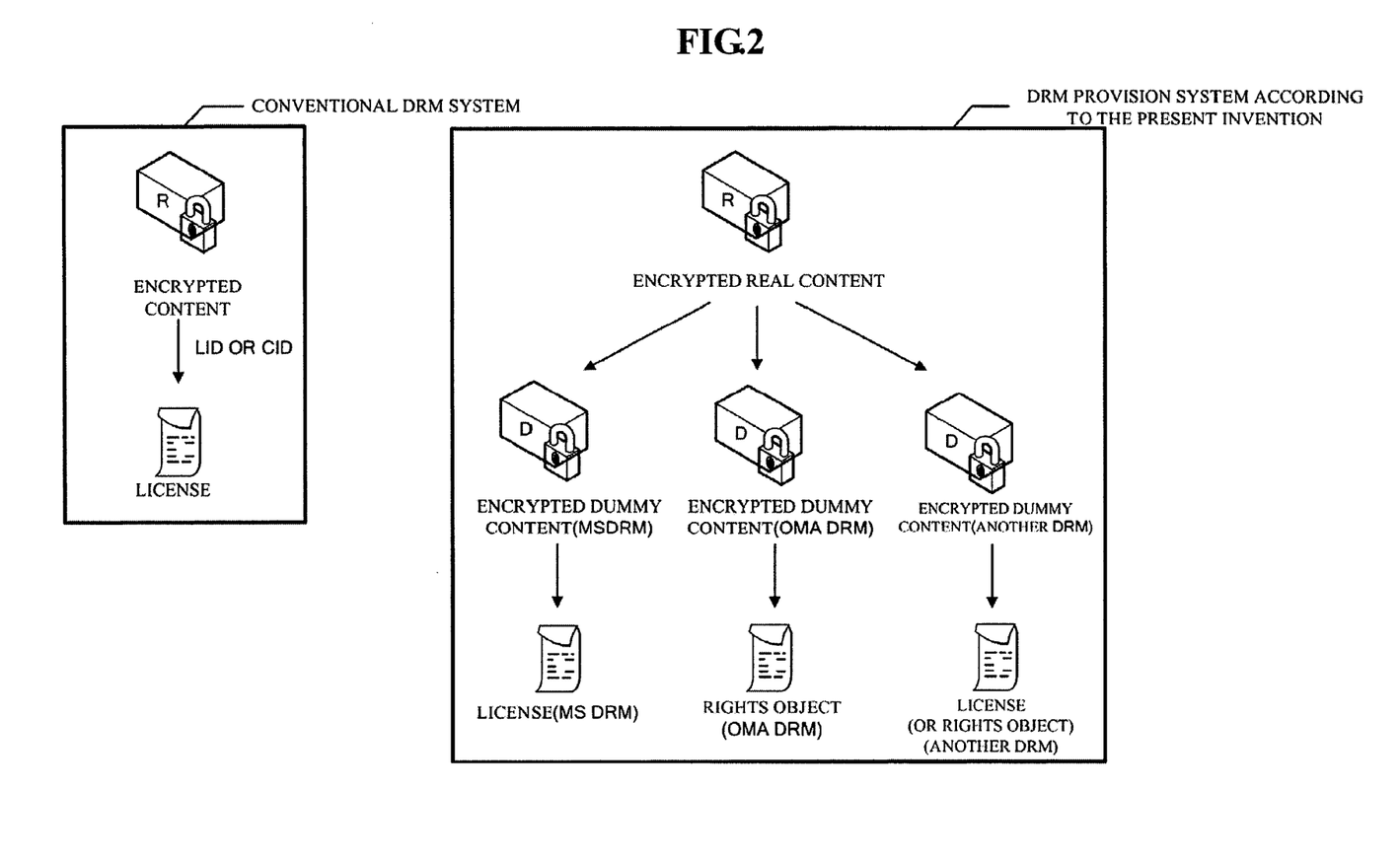
FIG. 2 illustrates a license binding structure of the DRM provision system according to an exemplary embodiment of the present invention.

FIG. 2 illustrates a license binding structure of the DRM provision system 10 according to an exemplary embodiment of the present invention. The DRM provision system 10 uses a different structure from that of a related DRM system which binds encrypted content to a license on a one-to-one basis.

Referring to FIG. 2, the related DRM system binds encrypted content and a license file for each DRM. Therefore, for 1 Gbyte of video, a memory with a capacity of n times 1 Gbyte is required.

On the other hand, the DRM provision system 10 according to the present invention provides a piece of encrypted real content and a bundle of approximately 5 Kbytes of encrypted dummy content and a license file for each DRM. Therefore, content provided by the DRM provision system 10 does not require a large memory space as in the related DRM system.

That is, the DRM provision system 10 according to the present invention has a hierarchical structure so that it can run both on a handset loaded with MSDRM and another handset loaded with OMA DRM.

When the related DRM system searches for a license in order to play back content, it reads a license ID (LID) or a content ID (CID) specified in a DRM handset of encrypted content and searches a license storage database (DB) or file for a corresponding license.

However, the DRM provision system 10 does not directly bind encrypted real content to a corresponding license in order to support both the MSDRM and the OMA DRM. Instead, the DRM provision system 10 includes dummy content between the encrypted real content and the corresponding license.

For example, if the host device 600 has the MSDRM, the DRM provision system 10 reads the ID of dummy content from encrypted real content and then searches for the dummy content protected by the MSDRM.

Then, if a file encrypted using the MSDRM is selected from the dummy content, the DRM provision system 10 obtains an LID from a header of a corresponding piece of dummy content and obtains a license from a license storage DB or file. The dummy content has a content format which can be played back or listened to by users. However, the dummy content merely serves as a medium by which the encrypted real content and the license can be bound to a number of versions of the DRM system. The license bound to the dummy content is a file that sets the rights for the encrypted real content. Meanwhile, the same process described above is applied to handsets loaded with the OMA DRM system and other DRM systems.

Figure 3:
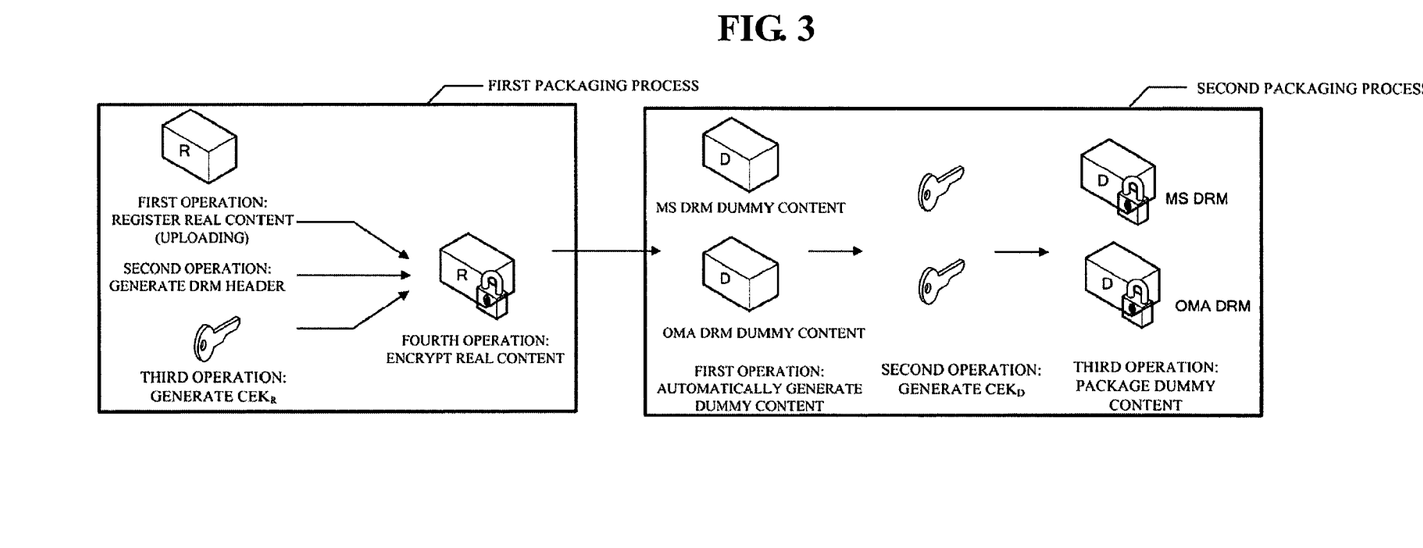
FIG. 3 illustrates the operation of a packaging server included in the DRM provision system according to an exemplary embodiment of the present invention.

FIG. 3 illustrates the operation of the packaging server 100 included in the DRM provision system 10 according to an exemplary embodiment of the present invention.

The packaging server 100 encrypts real content by performing the first and second packaging processes on the real content and generates dummy content and a DRM packaging file.

The first packaging process will now be described. The first packaging process includes a first operation of registering real content, a second operation of generating a DRM header, a third operation of generating a content encryption key (CEK), and a fourth operation of encrypting the real content.

Specifically, if a content provider registers real content with a CMS, the packaging server 100 generates a DRM header of the registered real content. The DRM header includes various forms of metadata that can explain content characteristics such as a dummy content name associated with encrypted content. In addition, information contained in the DRM header uses information registered with a metadata DB of the CMS, and a dummy content file name is automatically generated based on an uniform resource identifier (URI) registered with the CMS. In addition, the dummy content file name is composed of an English string with no more than 255 English characters.

The structure of the DRM header generated by the packaging server 100 will now be described with reference to FIG. 4.

Figure 4:
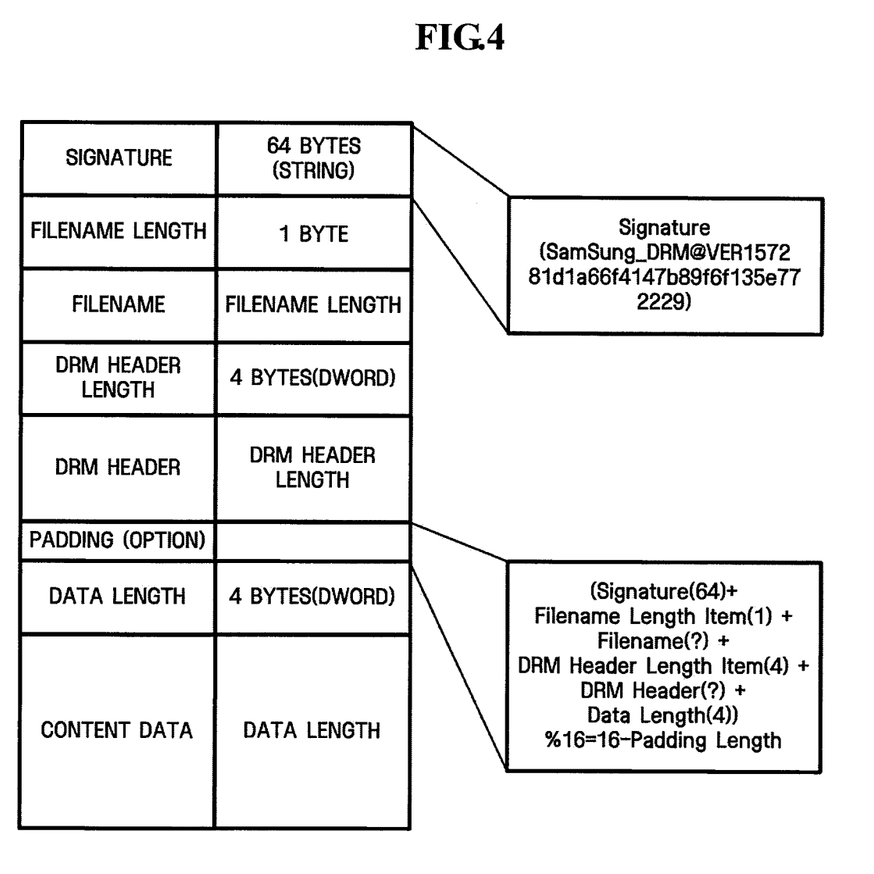
FIG. 4 illustrates the structure of a DRM header in the DRM provision system according to an exemplary embodiment of the present invention.

Referring to FIG. 4, DRM type is recorded in a signature field of a DRM header, and a filename of dummy content is recorded in a filename length field. A DRM encryption algorithm is recorded in a DRM header length field, and DRM version information is recorded in a DRM header field. In addition, option information is recorded in a padding field, information regarding content length is recorded in a data length field, and content data information is recorded in a content data field.

Referring back to FIG. 3, the packaging server 100 generates a CEK in order to encrypt the registered real content. In order to generate a CEK (indicated by reference character $CEK_R$) of the registered real content, the packaging server 100 generates a 16 byte-CEK using a seed value and base64-encodes the generated 16 byte-CEK. Here, the seed value uses a real-time session key value. While 'real-time' time information, when content is packaged, is used in the present exemplary embodiment, a random number table separately managed or other values may also be used. For example, certain music files, such as a musical instrument digital interface (MIDI), may be stored in a DB in the form of a random number table and may be used as $CEK_R$ for encrypting certain real content. In this case, $CEK_R$ is reproducible content.

Next, the real content is encrypted using the generated DRM header, $CEK_R$ and a symmetric key algorithm, and thus the encrypted real content is generated. The symmetric key algorithm uses an AES 128-bit algorithm and may also use other symmetric key algorithms.

If the first packaging process is completed, the second packaging process is performed. The second packaging process includes a first operation of generating dummy content, a second operation of generating a CEK of the dummy content, and a third operation of packaging the dummy content. The dummy content is not reproducible data, such as music or a movie, but an intermediate file for generating a license that sets the rights of encrypted content and binding the license to the encrypted content. If certain music files were used as $CEK_R$ in the first packaging process, the dummy content may be reproducible content.

Target dummy content of DRM packaging, which is to be supported, is automatically generated using $CEK_R$ that was used to encrypt the real content. Here, the body of the dummy content includes $CEK_R$.

For example, the OMA DRM generates dummy content in an MP3 format. Thus, the dummy content has a payload as a CEK. In addition, the MSDRM generates dummy content in a Windows Media Audio (WMA) format. The MSDRM can generate dummy content not only in the WMA format but also in Windows Media Video (WMV) and Advanced Systems Format (ASF) formats. Also, the OMA DRM can generate dummy content in various formats.

Next, after generating the dummy content in the second packaging process the packaging server 100 generates a CEK in order to encrypt the dummy content. The CEK of the dummy content is indicated by reference character $CEK_D$.

Figure 5:
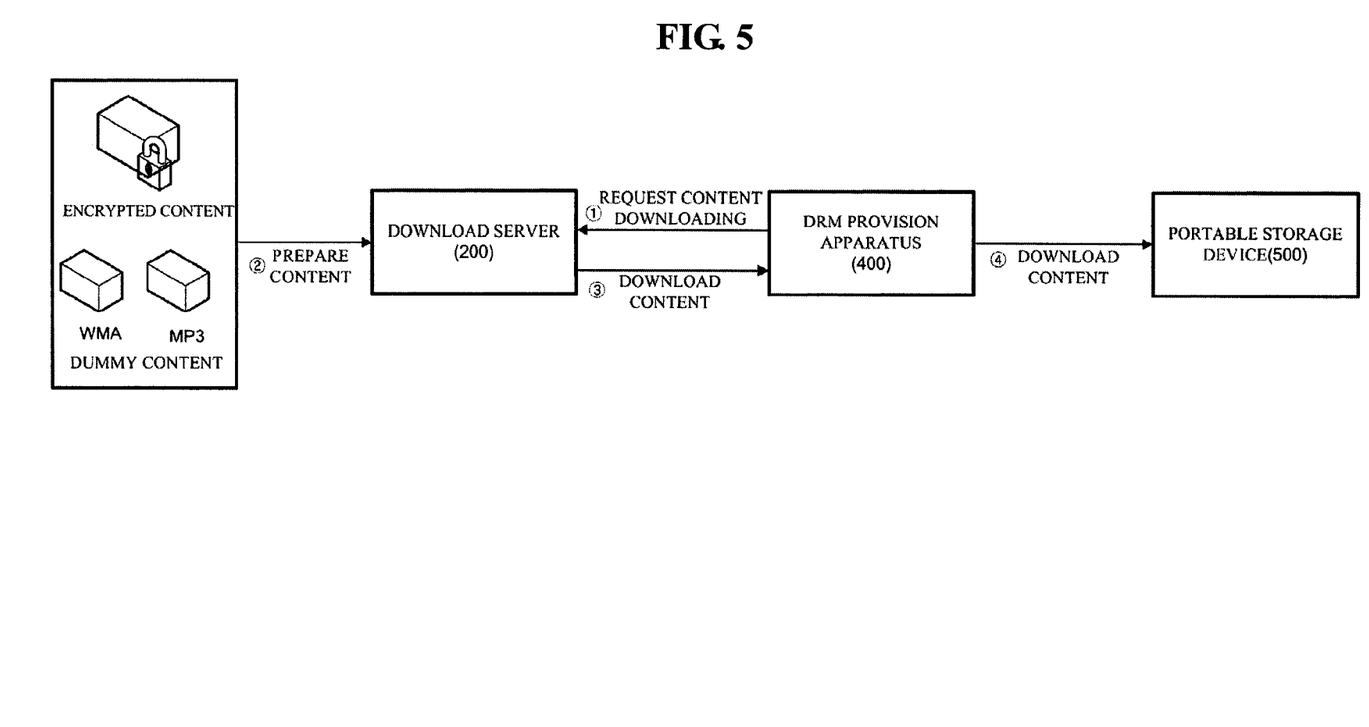
FIG. 5 illustrates the operation of downloading content using the DRM provision system according to an exemplary embodiment of the present invention.

FIG. 5 illustrates the operation of downloading content using the DRM provision system 10 according to an exemplary embodiment of the present invention.

Referring to FIG. 5, a user or a registration server checks whether the user's portable storage device 500 has been registered. Then, the user selects content that the user desires to purchase in a web page through the Internet and requests the download server 200 to download the selected content (operation ①).

Accordingly, the download server 200 requests a user authentication server (not shown) to authenticate information (provided by, for example, the portable storage device 500) requested by the user. If the portable storage device 500 is not registered with the user authentication server, the user's request for downloading the selected content is rejected. That is, the download server 200 downloads the requested content only after the user registers the portable storage device 500 with the user authentication server.

Next, the download server 200 prepares the requested content, i.e., encrypted content and dummy content to be downloaded (operation ②). The encrypted content is a file, such as a moving picture or music, which is copyrighted, and the dummy content is a file bound to a license for a content file or to a rights object.

The download server 200 transmits the content requested by the user to the DRM provision apparatus 400 (operation ③), and the DRM provision apparatus 400 downloads the received content to the portable storage device 500 (operation ④).

Then, the downloaded content (i.e., the encrypted content and the dummy content) is stored in a content DB. Since the encrypted content itself does not have a license, the license server 300 can be accessed only when the encrypted content exists together with the dummy content.

Figure 6:
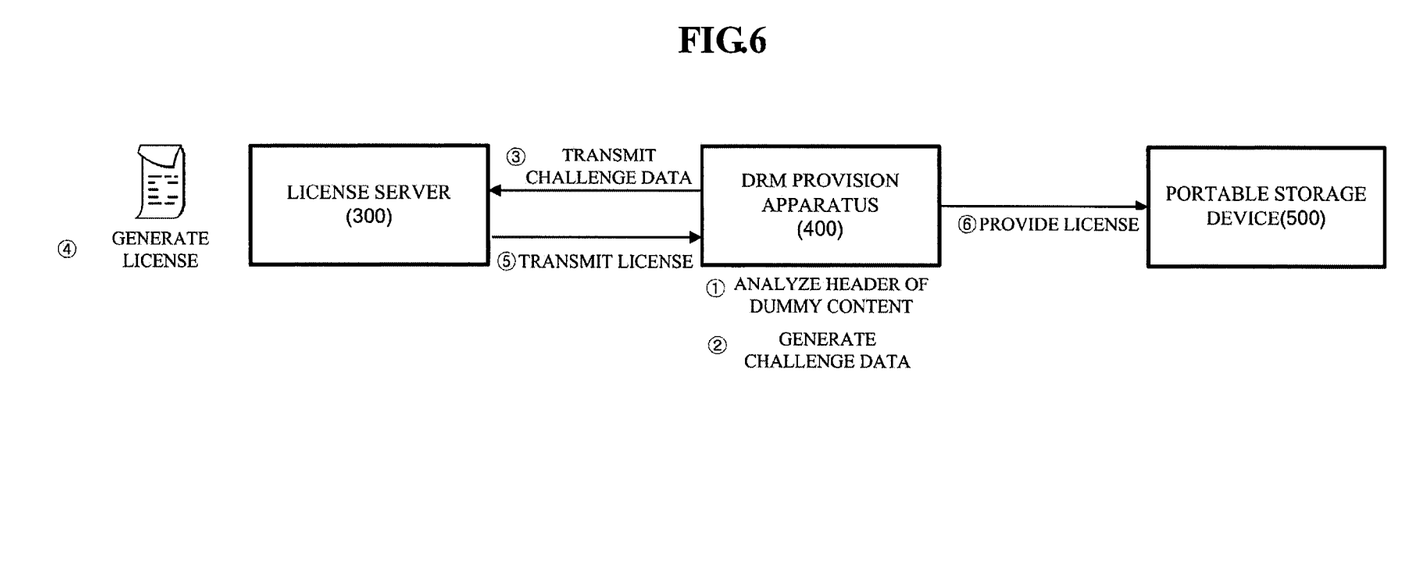
FIG. 6 illustrates the operation of receiving a license using the DRM provision system according to an exemplary embodiment of the present invention.

FIG. 6 illustrates the operation of receiving a license using the DRM provision system 10 according to an exemplary embodiment of the present invention. After content is downloaded, a user has to receive a license for the content in order to use the content. The license includes a CEK for decrypting the content as well as various rights for the content. In the present exemplary embodiment, the operation of obtaining a license using Windows Media (WM) DRM will be described.

The DRM provision apparatus 400 analyzes a DRM header of dummy content (operation ①). By analyzing the DRM header, the DRM provision apparatus 400 obtains URI information required to request the issuance of a license and a key ID (KID) value required to search for the license.

Then, the DRM provision apparatus 400 generates challenge data using the DRM header and a device certificate (operation ②) and transmits the generated challenge data to the license server 300 using a hypertext transfer protocol (HTTP)-post method (operation ③). The challenge data includes the DRM header and the device certificate and is base64-encoded.

The license server 300 base64-decodes the received challenge data and obtains the KID by analyzing the DRM header. Then, the license server 300 searches for a CEK that matches the obtained KID, encrypts the CEK using a public key included in the device certificate, and inserts the encrypted CEK into the license (operation ④). Here, the CEK is encrypted using an elliptic curve cryptography (ECC) asymmetric key encryption method.

The license server 300 base64-encodes the generated license and transmits the base64-encoded license to the DRM provision apparatus 400 (operation ⑤). A transmission method used here is a direct license acquisition (DLA) method. The DRM provision system 10 suggested in the present invention transmits the encoded license using the DLA method.

The DRM provision apparatus 400 provides the base64-encoded license to the portable storage device 500, and the portable storage device 500 stores the base64-encoded license.

Figure 7:
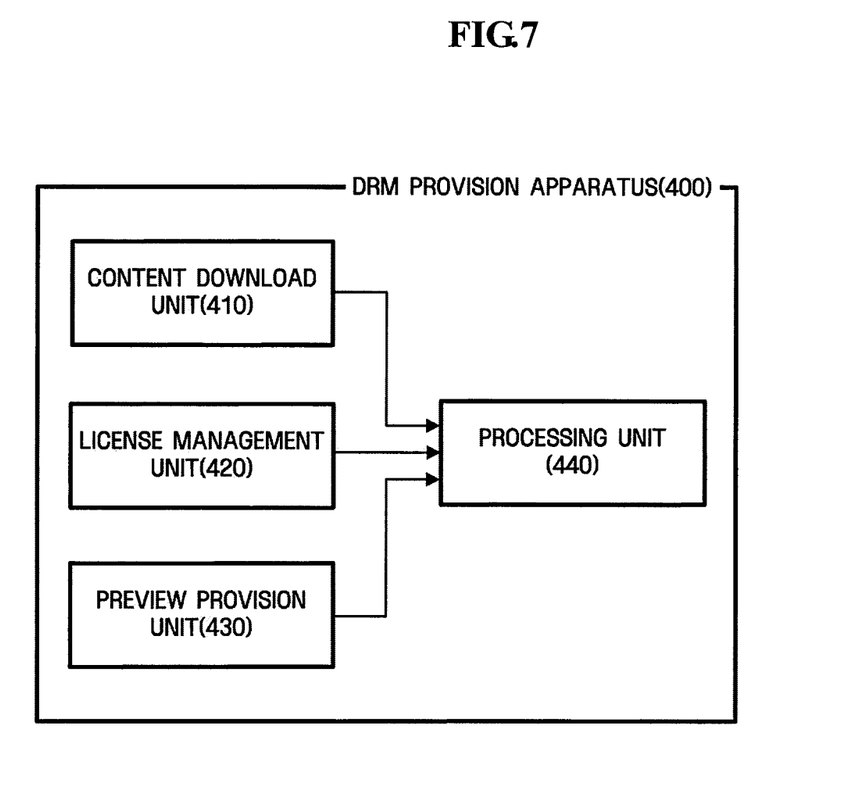
FIG. 7 is a block diagram of a DRM provision apparatus included in the DRM provision system according to an exemplary embodiment of the present invention.

FIG. 7 is a block diagram of the DRM provision apparatus 400 included in the DRM provision system 10 according to an exemplary embodiment of the present invention.

Referring to FIG. 7, the DRM provision apparatus 400 includes a content download unit 410, a license management unit 420, a preview provision unit 430, and a processing unit 440.

The content download unit 410 downloads content from the download server 200, and the downloaded content is stored in the portable storage device 500. The downloaded content includes encrypted real content and two pieces of dummy content (e.g., OMA DRM- *.dcf and MS-DRM-*.wma), which are managed together as a single piece of complex content.

The license management unit 420 receives a license (or a rights object) from the license server 300 so that a user can use the downloaded content. A license transmitted using an OMA DRM method and a license transmitted using an MS DRM method are stored in respective storage areas for licenses.

For example, an OMA rights object is stored in a rights object DB, and an encrypted storage space is configured and used in order to prevent rights from being arbitrarily accessed or modified. In addition, an MS DRM rights object is stored in a hash storage unit.

The preview provision unit 430 provides the content, which was downloaded by the content download unit 410 at the request of the user, on a preview screen.

The processing unit 440 manages the operation of each of the content download unit 410, the license management unit 420, and the preview provision unit 430 included in the DRM provision apparatus 400. In addition, the processing unit 440 provides the real content and the dummy content downloaded by the content download unit 410 and a license of the dummy content provided by the license management unit 420 to the portable storage device 500.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and units or further separated into additional components and units.

Figure 8:
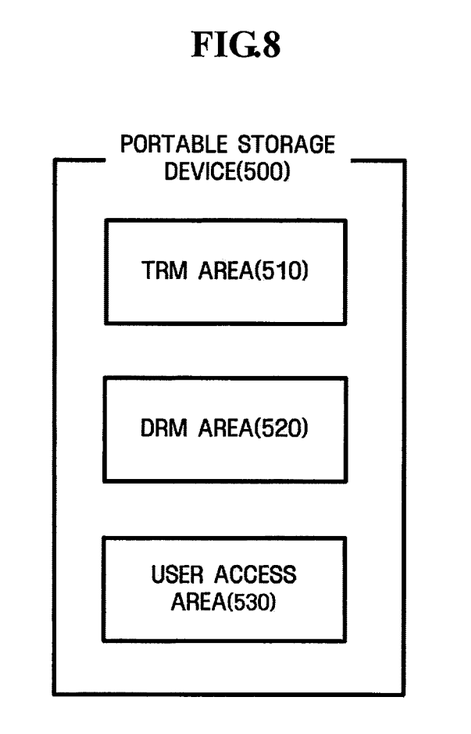
FIG. 8 is a block diagram of a portable storage device included in the DRM provision system according to an exemplary embodiment of the present invention.

FIG. 8 is a block diagram of the portable storage device 500 included in the DRM provision system 10 according to an exemplary embodiment of the present invention.

Referring to FIG. 8, the portable storage device 500 includes storage space, i.e., a tamper resistant module (TRM) area 510, a DRM area 520, and a user access area 530.

The TRM area 510 stores DRM security information. That is, the TRM area 510 stores a serial number of the portable storage device 500, a public/private key, a certificate, a device group key, etc. for each DRM.

The TRM area 510 may be created when the portable storage device 500 is manufactured. Alternatively, the TRM area 510 may be written once when the portable storage device 500 is first used after being purchased. In this case, the TRM area 510 can be written after being authenticated by a network server. For security, it is desirable to create the TRM area 510 in advance when the portable storage device 500 is manufactured. The TRM area 510 is where data can be read only. The data stored in the TRM area 510 can be read using a particular application programming interface (API) that accesses the portable storage device 500.

The rights to access the data recorded in the TRM area 510 must be given only to a DRM agent (not shown), and an external user must be prohibited from moving or changing the data.

The DRM area 520 stores encrypted dummy content and a license file (or a rights object). Even if the DRM area 520 is open to the outside, no security problem arises. However, if a user of the portable storage device 500 accesses the DRM area 520 and removes or changes a file therein, a fatal problem to the operation of the DRM agent may arise. Such a file is stored in the DRM area 520. In addition, the DRM area 520 can be accessed using an API provided by the DRM agent or a particular portable storage device.

The user access area 530 stores encrypted real content, such as video or audio, which can actually be played back. General users can arbitrarily read or write content in the user access area 530.

Figure 9:
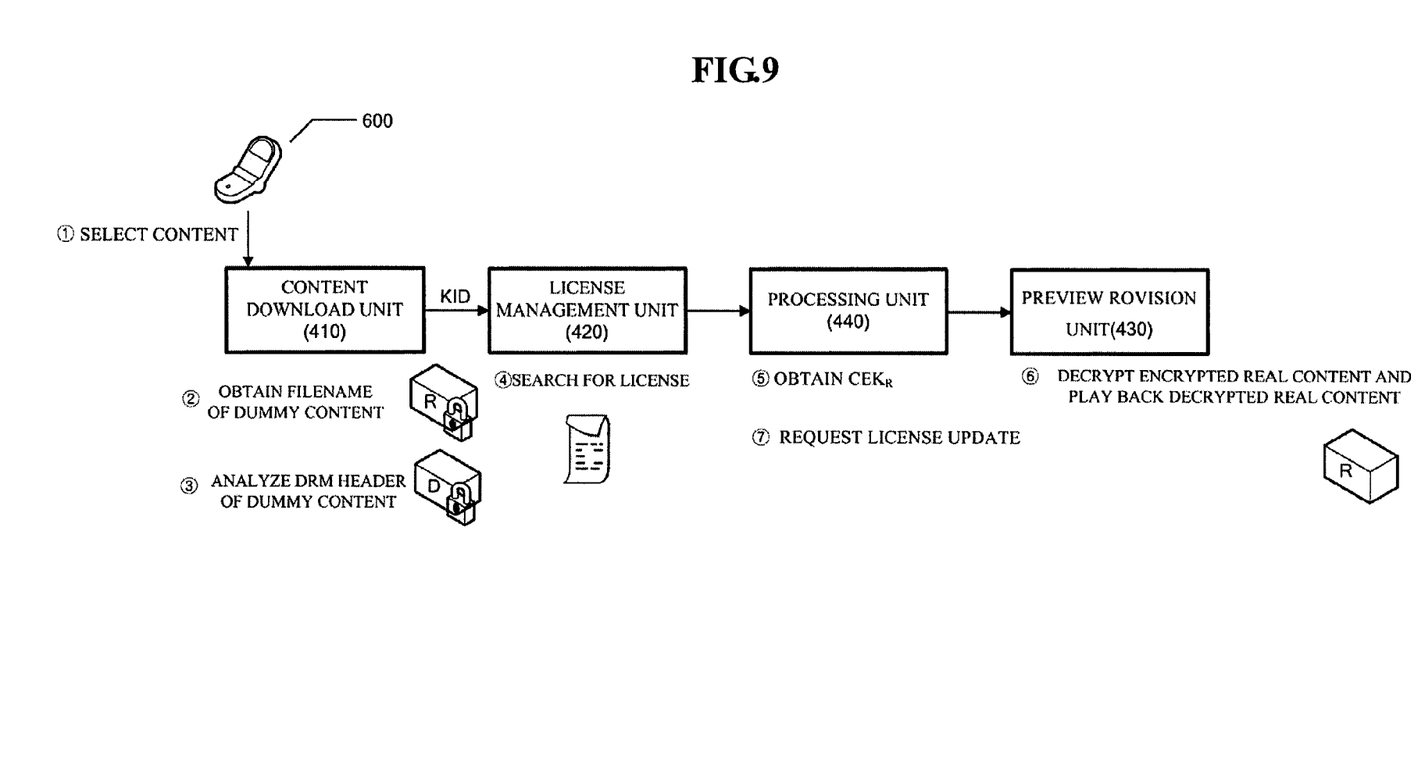
FIG. 9 illustrates the operation of a host device included in the DRM provision system according to an exemplary embodiment of the present invention.

FIG. 9 illustrates the operation of the host device 600 included in the DRM provision system 10 according to an exemplary embodiment of the present invention. In the present exemplary embodiment, it is assumed that the host device 600 also performs the function of the DRM provision apparatus 400 and includes the portable storage device 500. In the present exemplary embodiment, the operation of playing back encrypted content using an MS DRM agent is described.

Referring to FIG. 9, if a user selects desired content (operation ①), the content download unit 410 determines whether DRM has been applied to a selected file. If the selected file is encrypted content, the content download unit 410 searches for a filename of dummy content in order to search for a license of the encrypted content (operation ②). Here, the filename of the dummy content is read from the DRM header.

Next, URI information required to request the issuance of the license and a KID required to search for the license are obtained by analyzing the DRM header (operation ③). Then, the license management unit 420 searches for the license stored in the DRM area 520 of the portable storage device 500 using the obtained KID (operation ④).

If it turns out that the license does not exist or has expired, the license management unit 420 requests the license server 300 to issue a license through a license downloading process. If the license management unit 420 obtains the license from the DRM area 520 of the portable storage device 500, it transmits the obtained license to the host device 600.

The host device 600 reads a decryption key $CEK_D$ of the dummy content included in the license. Since the decryption key $CEK_D$ of the dummy content is encrypted using a public key, the encrypted decryption key is decrypted using a private key stored in the TRM area 510. Consequently, the decryption key $CEK_D$ is obtained. Then, the dummy content is decrypted, and thus $CEK_R$ of the encrypted real content is obtained (operation ⑤).

Next, the encrypted real content is decrypted using $CEK_R$, and a file is played back (operation ⑥). The real content has been encrypted using the symmetric key (e.g., AES 128-bit) algorithm.

If the encrypted real content is normally played back, the host device 600 requests the license management unit 420 to update the license (for example, update a playback count) (operation ⑦).

Figure 10:
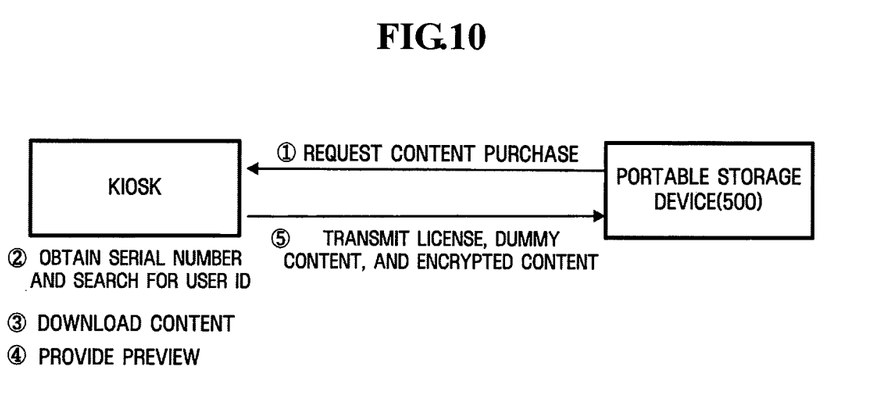
FIG. 10 illustrates the operation of receiving DRM content using a kiosk included in the DRM provision system according to an exemplary embodiment of the present invention.

FIG. 10 illustrates the operation of receiving DRM content using a kiosk included in the DRM provision system 10 according to an exemplary embodiment of the present invention. First of all, a user has to register the portable storage device 500 before downloading content using the kiosk. The kiosk is an exemplary embodiment of the DRM provision apparatus 400.

The user connects the portable storage device 500 (e.g., an MMC) to a portable storage device interface or universal serial bus (USB) interface of the kiosk, selects desired content and its license type from a product list of the kiosk, and makes a purchase request (operation ①).

Next, the kiosk identifies the portable storage device 500 that the user connected thereto. The kiosk includes a table that matches a user ID with a serial number of the portable storage device 500. Therefore, the kiosk searches the table for the user ID based on the serial number of the portable storage device 500 connected thereto (operation ②). Alternatively, the kiosk may perform an authentication process through a network server.

Referring to the internal structure of the kiosk, the kiosk includes a TRM folder, a DRM folder, and a content folder. The TRM folder stores a table in which a user ID is matched with a serial number, and the DRM folder stores a license and dummy content for each user ID. In addition, the content folder stores encrypted content.

The kiosk downloads content at a shared directory using Active X (operation ③). Here, real content and dummy content are downloaded together.

If the content is downloaded, the kiosk obtains a license for the content selected by the user based on the found user ID. The process of obtaining the license for the content from the license server 300 using the kiosk is identical to the process of obtaining a license described above with reference to FIG. 6, and thus a detailed description thereof will be omitted.

Then, the kiosk provides a preview of the downloaded content (operation ④). If the user selects a [Playback] function on a purchase screen of the kiosk, a preview screen appears. Here, if the user selects a content type to preview, a content list is displayed. If the user selects the [Playback] function on the right of the content list, a preview function is executed. For the preview function, the encrypted real content is decrypted. Since the operation of decrypting encrypted content has been described above with reference to FIG. 9, a detailed description thereof will be omitted.

If the preview function is completed, the license for the content selected by the user based on the found user ID, the dummy content, and the encrypted content are transmitted to the portable storage device 500, and thus the purchasing process of the content is completed (operation ⑤).

As described above, a DRM provision apparatus, system, and method according to the present invention provide at least one of the following advantages.

Since a content provision system is implemented using one or more DRM (MSDRM, OMA DRM, and the like) systems, it can provide content packaged using a unified encryption algorithm.

In addition, DRM content, which can be played back by host devices having different DRM systems, can be provided.

Regardless of an encoding format of copyrighted real content, multi-DRM packaging is provided for content in all formats. Therefore, there is no need for a content provider to spend additional money to encode content.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

What is claimed is:

1. A digital rights management (DRM) provision system comprising:
   a packaging server which is configured to perform first packaging of encrypting a specific content to generate encrypted content, and second packaging of generating at least one dummy content corresponding to the encrypted content and encrypting the dummy content to generate encrypted dummy content; and
   a DRM provision apparatus which is configured to receive the encrypted content and the at least one encrypted dummy content corresponding to the encrypted content, analyze a DRM header of the received encrypted dummy content to request a license including a first decryption key for decrypting the encrypted dummy content, receive the license including the first decryption key for decrypting the encrypted dummy content from a license server, decrypt the dummy content based on the received first decryption key, and decrypt the encrypted content using the decrypted dummy content,
   wherein the packaging server and the DRM provision apparatus comprise a processor.

2. The system of claim 1, wherein the DRM header of the received encrypted dummy content includes uniform resource identifier (URI) information required to request issuance of the license and a key ID (KID) value required to search for the license.

3. The system of claim 1, wherein the license includes a right to the content.

4. The system of claim 1, wherein the license is generated based on information of the encrypted dummy content.

5. The system of claim 1, wherein the at least one encrypted dummy content is generated for each DRM standard of a plurality of DRM standards.

6. The system of claim 1, wherein the at least one encrypted dummy content is a file required to receive a license for each DRM standard of a plurality of DRM standards.

7. The system of claim 1, wherein the encrypted content and the at least one encrypted dummy content are generated from the packaging server.

8. The system of claim 1, wherein the DRM provision apparatus is further configured to analyze the DRM header of the encrypted dummy content to obtain a uniform resource identifier (URI) and a key ID (KID), and to request a license for the encrypted dummy content based on the URI.

9. The system of claim 1, wherein the DRM provision apparatus is further configured to store the encrypted content, the at least one encrypted dummy content and the license in a portable storage device.

10. The system of claim 1, wherein the DRM provision apparatus provides the decrypted content on a preview screen.

11. The system of claim 1, wherein the encrypted content and the at least one encrypted dummy content are downloaded to a download server, and the download server provides encrypted content and at least one encrypted dummy content for predetermined content requested by a user to the DRM provision apparatus.

12. The system of claim 1, wherein the DRM provision apparatus is further configured to request a license server to issue a license for the encrypted content.

13. The system of claim 1, wherein the at least one encrypted dummy content comprises a key used to decrypt the encrypted content.

14. The system of claim 1, wherein the at least one encrypted dummy content and the header of the at least one encrypted dummy content are part of the second packaging.

* * * * *